United States Patent
Herrmann et al.

(10) Patent No.: US 7,430,922 B2
(45) Date of Patent: Oct. 7, 2008

(54) SENSOR DEVICE FOR INDICATING WEAR STATES ON CONTACT BODIES

(75) Inventors: Winfried Herrmann, Berlin (DE); Bernd Kinast, Berlin (DE); Eckhard Munkow, Berlin (DE)

(73) Assignee: Pantrac GmbH, Berlin (DE)

( * ) Notice: Subject to any disclaimer, the term of this patent is extended or adjusted under 35 U.S.C. 154(b) by 12 days.

(21) Appl. No.: 10/596,905

(22) PCT Filed: Jan. 4, 2005

(86) PCT No.: PCT/EP2005/000146

§ 371 (c)(1),
(2), (4) Date: Apr. 18, 2007

(87) PCT Pub. No.: WO2005/065985

PCT Pub. Date: Jul. 21, 2005

(65) Prior Publication Data

US 2007/0272506 A1  Nov. 29, 2007

(30) Foreign Application Priority Data

Jan. 5, 2004  (DE) ................. 10 2004 001 799

(51) Int. Cl.
*G01N 3/00* (2006.01)
*G01N 3/32* (2006.01)

(52) U.S. Cl. .......................... 73/816; 73/808
(58) Field of Classification Search ............ 73/808
See application file for complete search history.

(56) References Cited

U.S. PATENT DOCUMENTS

| | | | | | |
|---|---|---|---|---|---|
| 3,929,179 | A | * | 12/1975 | Hines | 152/154.2 |
| 4,409,824 | A | * | 10/1983 | Salama et al. | 73/152.48 |
| 4,442,707 | A | * | 4/1984 | Tuzson | 73/86 |
| 4,536,670 | A | * | 8/1985 | Mayer | 310/249 |
| 4,757,307 | A | * | 7/1988 | Keramati et al. | 340/680 |
| 4,785,894 | A | * | 11/1988 | Davis et al. | 175/39 |
| 4,820,980 | A | * | 4/1989 | Dodson-Edgars | 324/207.24 |
| 6,810,751 | B2 | * | 11/2004 | Moreno et al. | 73/849 |

FOREIGN PATENT DOCUMENTS

DE  44 25 460 A1  1/1996
EP  0 525 595 A1  2/1993

* cited by examiner

*Primary Examiner*—Max Noori (57) ABSTRACT

The invention relates to a sensor device for indicating wear states on contact bodies of pantographs of electrically driven vehicles, said contact bodies being fixed to metallic supports. The aim of the invention is to provide a sensor device that permits, at practically any location on the contact strip, the installation of signal transmitters that can indicate the respective wear state of the contact strip without interrupting the driving operation. To this end, the invention employs the use of a sensor device characterized in that it is comprised of blind holes (3) made in the contact bodies (2), of transmission channels (6) that are connected to the blind holes (3), and of a monitoring unit, whereby the blind holes (3) and monitoring unit are connected via the transmission channels (6). In addition, a medium that generates signals in the instance of a specified wear state is located inside the blind holes (3), and a medium that transmits these signals to the monitoring unit is located inside the transmission channel.

22 Claims, 10 Drawing Sheets

SENSOR DEVICE FOR INDICATING WEAR STATES ON CONTACT BODIES

The invention is directed to a sensor assembly for signaling wear conditions on contact bodies according to the preamble of claim 1.

Pantographs of electrically driven vehicles are typically constructed from contact bodies which are attached to a metallic support. The support is then connected to a pantograph which presses the contact body against a current-carrying conductor of an overhead wire system. During operation of the electrically driven vehicle, particularly at high-speed, the contact bodies experience substantial abrasion. In addition, vibrations and other shock-like loading occur. The sensor assembly which cooperates with a monitoring and safety system is provided for the purpose of indicating wear conditions on contact bodies to the operators, who monitor malfunctions and wear conditions. Various implementations of such devices are known.

For example, DE 44 254 60 A1 describes a monitoring unit for monitoring the operation of contact elements of pantographs during operation. The monitoring unit is characterized, in particular, in that the support side of the contact body has a groove in which a fluid pressure is maintained. If the contact body is damaged, causing a pressure drop in the groove, the pantograph is immediately lowered and the electrically driven vehicle may possibly be stopped. This system is designed so that the vehicle is eventually stopped in the event of a pressure drop, which disadvantageously may cause problems when the vehicle is to be returned and repaired.

This monitoring system is not capable of determining early wear stages before a complete failure occurs.

EP 0 525 595 A1 discloses a monitoring unit for contact bars of pantographs, where several light guides are embedded in the contact bars. The end sections of the light guides embedded in the contact bar are connected to a transmitter and a receiver, which transmit and receive light pulses through the light guides. When a light guide is damaged, the predetermined sequence of light pulses would be interrupted, thus indicating a malfunction. Disadvantageously, as described therein, introducing the light guides in the contact bars, in particular passing the entire length of the light guides through the contact bars, is a relatively complicated technological process. In addition, the embedded light guides mechanically weaken the contact bars.

It is therefore an object of the invention to provide a sensor assembly which allows installation of signal transmitters at practically any desirable location on the contact bar, and which is capable of indicating the respective wear condition of the contact bar without interfering with the operation of the vehicle.

The object is solved by the features of claim 1.

Accordingly, the sensor assembly of the invention for signaling wear conditions on contact bodies of pantographs of electrically driven vehicles is characterized in that the sensor assembly includes blind holes introduced in the contact body, transmission channels in communication with the blind holes, and a monitoring unit, wherein the blind holes and the monitoring unit are connected via the transmission channels, and that a medium which generates signals at a predetermined wear condition is disposed in the blind holes, and a medium which transmits these signals to the monitoring unit is disposed in the transmission channels.

Advantageous modifications are recited in the dependent claims.

According to one advantageous embodiment, the medium generating the signal and the medium transmitting the signal are identical.

Advantageously, in one modification, the medium generating and transmitting the signal is a hydraulic fluid. Particularly suited for this purpose is compressed air.

According to another modification, the medium generating and transmitting the signal is an electrically conductive medium.

According to another embodiment, the medium generating and transmitting the signal is a light-conducting medium.

According to an advantageous modification of the invention, the medium generating the signal and the medium transmitting the signal are not identical, for example, when optical signals are converted into and transmitted as electrical pulses.

According to another embodiment, the medium generating the signal is a current conductor, a light guide, a photodiode or a camera.

In another embodiment, several blind holes are arranged in spaced-apart relationship, so that the wear condition can potentially be determined over the entire contact body.

In another embodiment, the spaced blind holes are oriented vertically.

According to another important advantage of the invention, the blind holes can have different hole depths, so that the operating personnel can ascertain the wear condition of the contact body at any time. This applies particularly to a modification where each blind hole or groups of blind holes have separate transmission channels.

In an advantageous embodiment of the invention, the blind holes extend through a side face of the contact body with an acute angle in the direction of the contact surface, so that sensor devices can effectively be applied to the contact bars at a later time.

Additional embodiments of the invention contemplate blind holes with a cylindrical or conical shape. The conical shape has the advantage that the size of the cross-section for the incident light can be continuously monitored by using photodiodes or a camera, so that a measure of the wear condition can be transmitted to the monitoring unit. The medium generating the signal, for example a photodiode or a camera should here be positioned in the entry region of the blind hole.

According to another embodiment of the invention, when using a photodiode, a camera or a light guide, an additional hydraulic fluid, such as compressed air, can be applied in the blind holes the associated transmission channels, so that when the blind holes, for example a conical blind hole, are exposed, any material entering due to normal wear is blown out, thereby preventing interference with the operation of the photodiode, the camera or the light guide.

In a modification of the invention, the transmission channels are arranged in the support below the contact material and are connected therefrom to the monitoring unit via additional transmission channels.

According to another embodiment, the transmission channels, which are in communication with the blind holes, are arranged outside the support and are connected therefrom to the monitoring unit via additional transmission channels.

When using several mutually independent air supply channels and/or hoses, separate monitoring units with different settings can be employed to indicate different warning signals for different wear conditions of the contact material. The indicated wear conditions of the contact material depend on the depths of the outlet nozzles in the contact material. When using a single air supply channel, several warning levels can also be implemented by using different outlet nozzles of different length and diameter. A lesser quantity of the medium is exhausted through the outlet nozzle having a smaller diameter. The flow rate is therefore smaller than for an outlet nozzle having a larger diameter. The monitoring unit associates the corresponding flow with the corresponding output signal.

In the following, the invention will be described in more detail with reference to drawings and exemplary embodiments.

Figure 1:
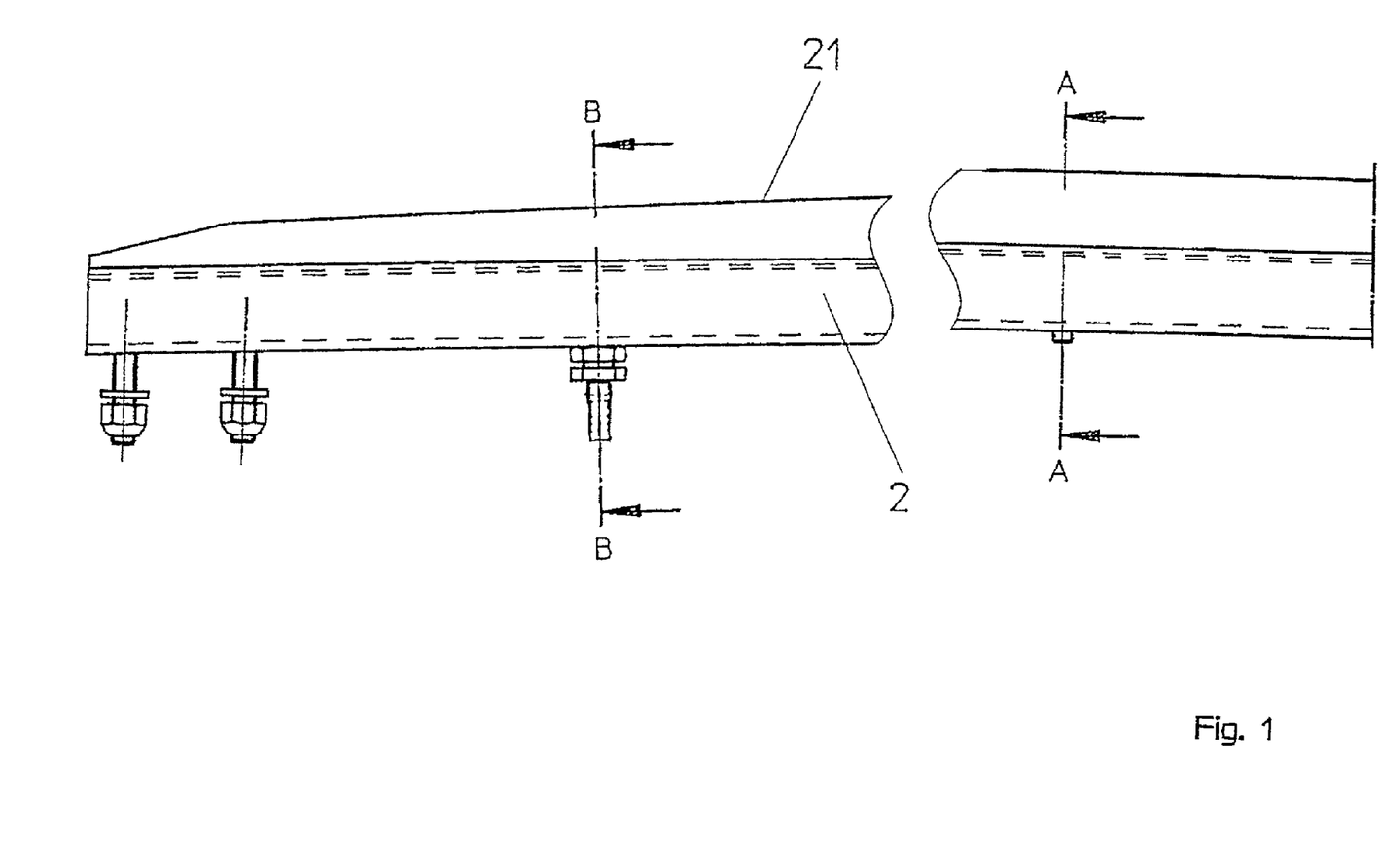
FIG. 1 shows schematically a side view of a contact bar which is mounted on a support, with transmission channels in the support.

FIG. 1 shows a contact bar attached to a support, with transmission channels disposed in the support, forming part of a pantograph 1.

Figure 2:
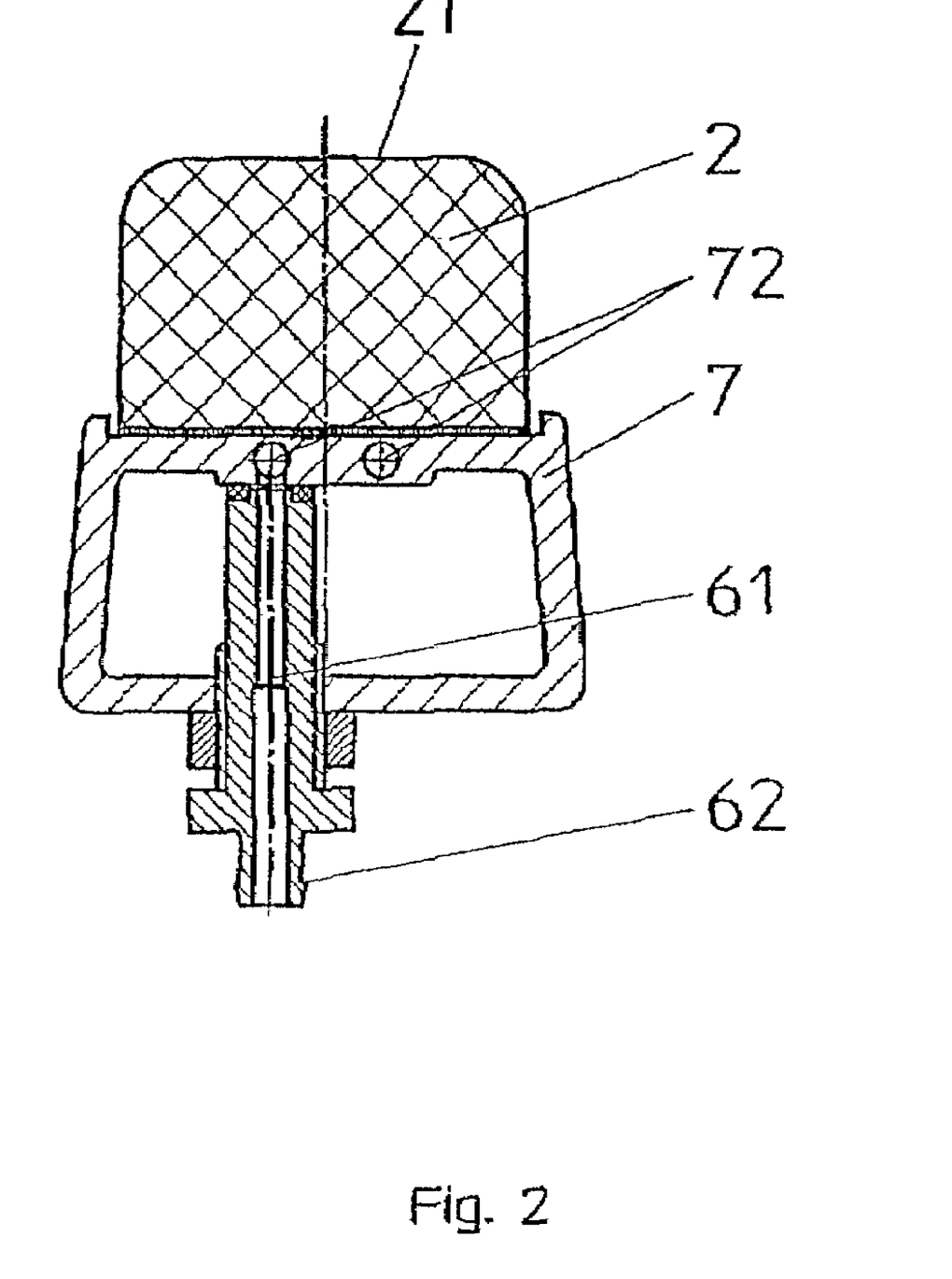
FIG. 2 shows a cross-sectional view of a fitting of the continuing transmission channel (section B-B of FIG. 1)
Figure 3:
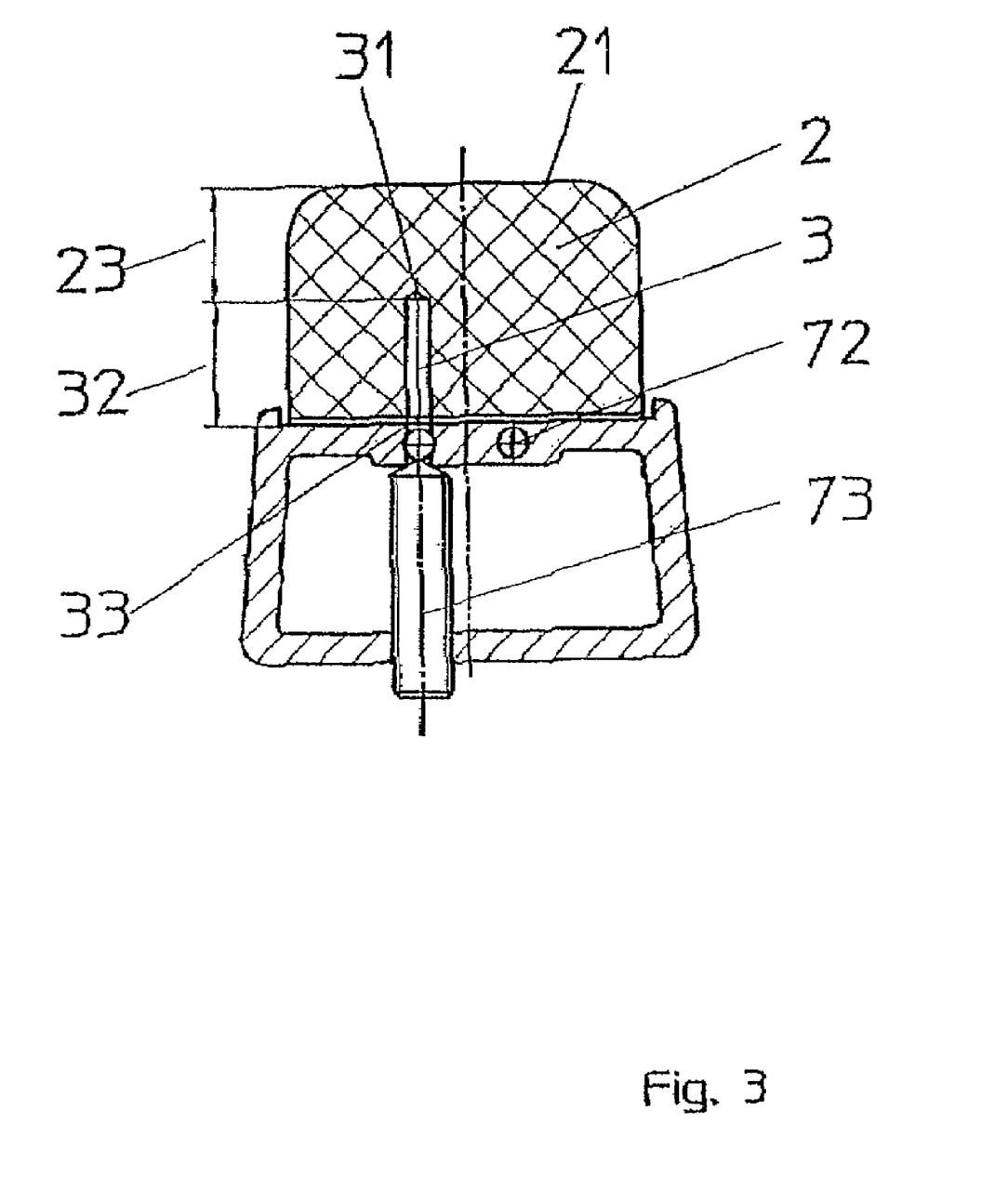
FIG. 3 shows a cross-sectional view of a blind hole in the contact body (section A-A of FIG. 1)

The corresponding cross-sectional views A-A and B-B are shown in FIG. 3 and FIG. 2, respectively.

A base surface 22 of a contact body 2 is attached to a shaped surface 71 of a support 7. During the operation of an electrically driven vehicle, a contact surface 21 of the contact body 2 makes contact with the overhead wire (not shown). Support channels 72 are established in the support 7 below the shaped surface 71 of the support 7. The support channels 72 extend essentially across the entire length of the support 7. Blind holes 3 are formed in the contact body 2 so that a corresponding hole entrance opening 33 is directly connected with the support channels 72. After the contact body 2 is attached to the shaped surface 71 of the support 7, the blind holes 3 can be formed in the contact body 2 by forming an opening which extends through the support 7 and the support channels 72 into the contact body 2. The opening, which is formed in the support 7 and extends into the support channel 72, is closed with a sealing pin 72, as shown in FIG. 3. FIG. 2 shows the configuration of a threaded insert 61 which is screwed into the support channel 72. The threaded insert 61 is provided with a hose connection 62 adapted for connection to a transmission channel 6. In this illustration, two support channels 72 are provided in the support 7. Additional support channels 72 can be provided depending on the arrangement and number of the blind holes 3. A hole depth 32 extending from the hole entrance opening 33 to the hole bottom 31 determines the wear height 23. The transmission channel 6 is extended onward to the monitoring units (not shown). Compressed air forms the medium generating and transmitting the signal and is introduced into the system which includes transmission channels 6, support channels 72 and blind holes 3. During the operation of the vehicle, removal of the contact material causes a decrease in the wear height 23. When sufficient material is removed to expose the hole bottom 31, the compressed air escapes, producing a noticeable pressure drop and/or a noticeable change in the flow resistance of the compressed air, which are processed and indicated in the monitoring unit as a wear signal.

Figure 4:
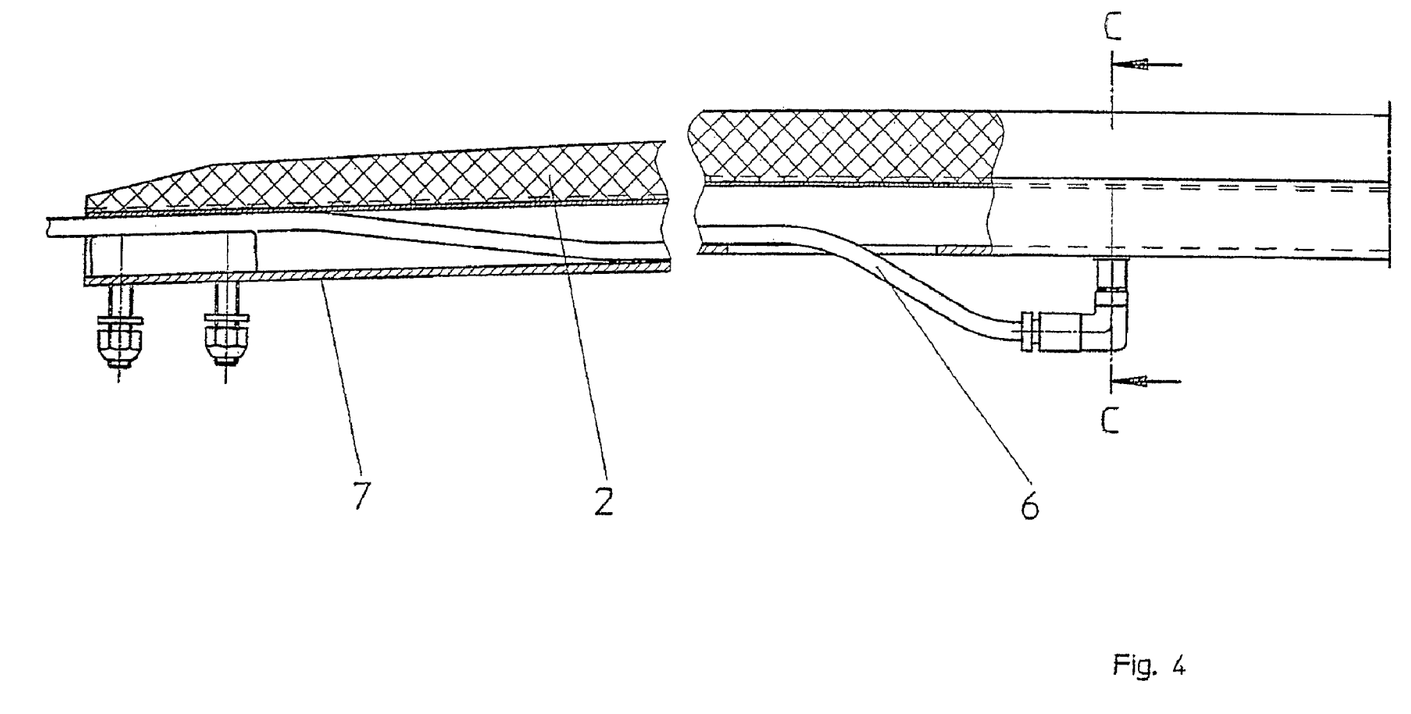
FIG. 4 shows a cross-sectional view of a contact body with a transmission channels arranged outside the support.
Figure 5:
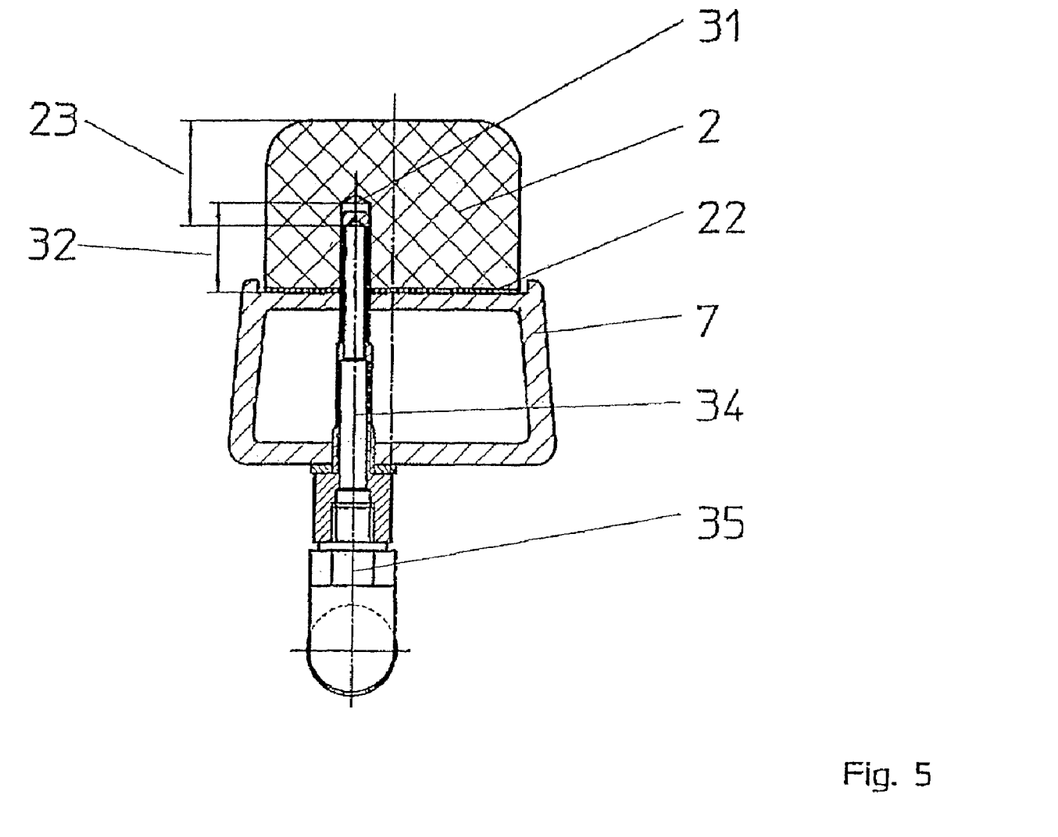
FIG. 5 shows another cross-sectional view of a blind hole (section C-C of FIG. 4)

An air-gas mixture flows continuously through the open outlet nozzle during operation to prevent contaminants/water from entering the wear monitoring system through the open outlet nozzles. The flow rate can be changed FIG. 4 and FIG. 5 show a modification of the transmission channel and the blind hole 3. A threaded tubular insert 34 is screwed into the blind hole 3 which is formed in the contact body 2 in a manner described above. A rotatable threaded elbow joint 35 located outside the support 7 provides a connection to transmission channels 6 implemented as hoses.

Figure 6A:
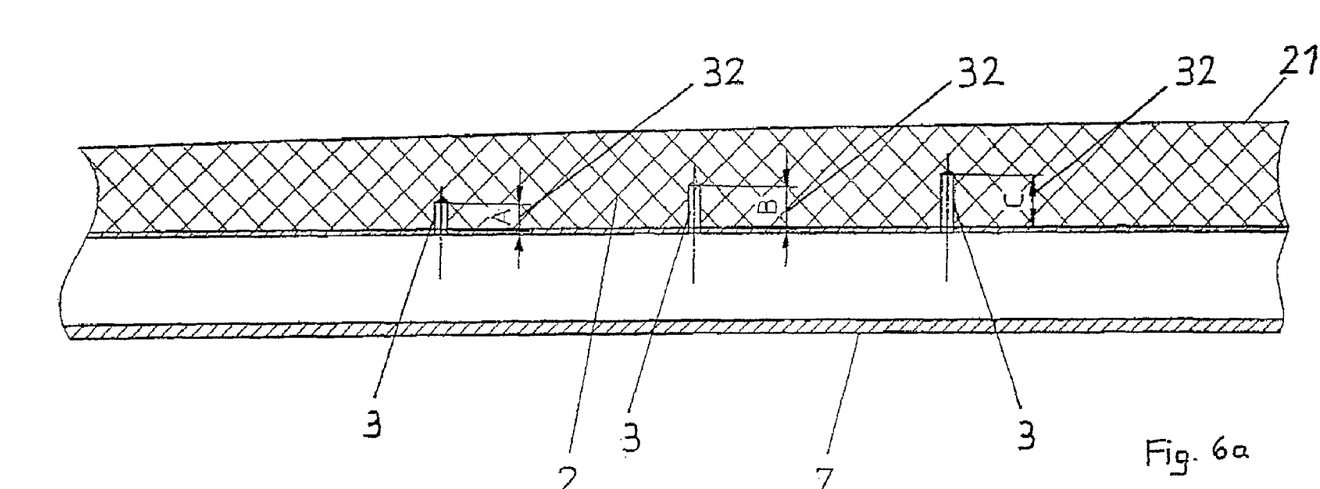
FIG. 6a is a schematic side view of blind holes applied with a different depth.

In FIG. 6a, blind holes 3 having different depth are introduced in the contact body 2. The illustrated blind holes 3 have hole depths 32A, B and C, whereby A indicates the smallest hole depth and C the greatest hole depth.

Figure 6B:
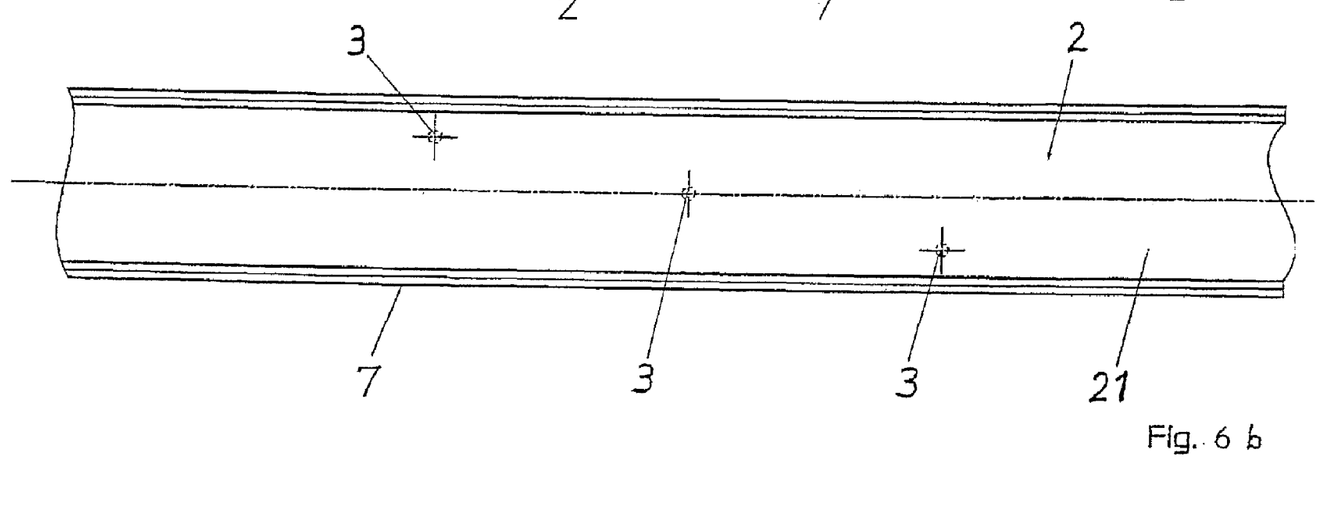
FIG. 6b is a diagram of the horizontal distribution of the blind holes applied with the different depths.

In addition, FIG. 6b illustrates the distribution of the blind holes 3 across the width of the contact body 2, as viewed in the direction of a contact surface 21. The different hole depth 32 of the blind holes 3 can advantageously be used to record wear conditions at an early stage.

Figure 7:
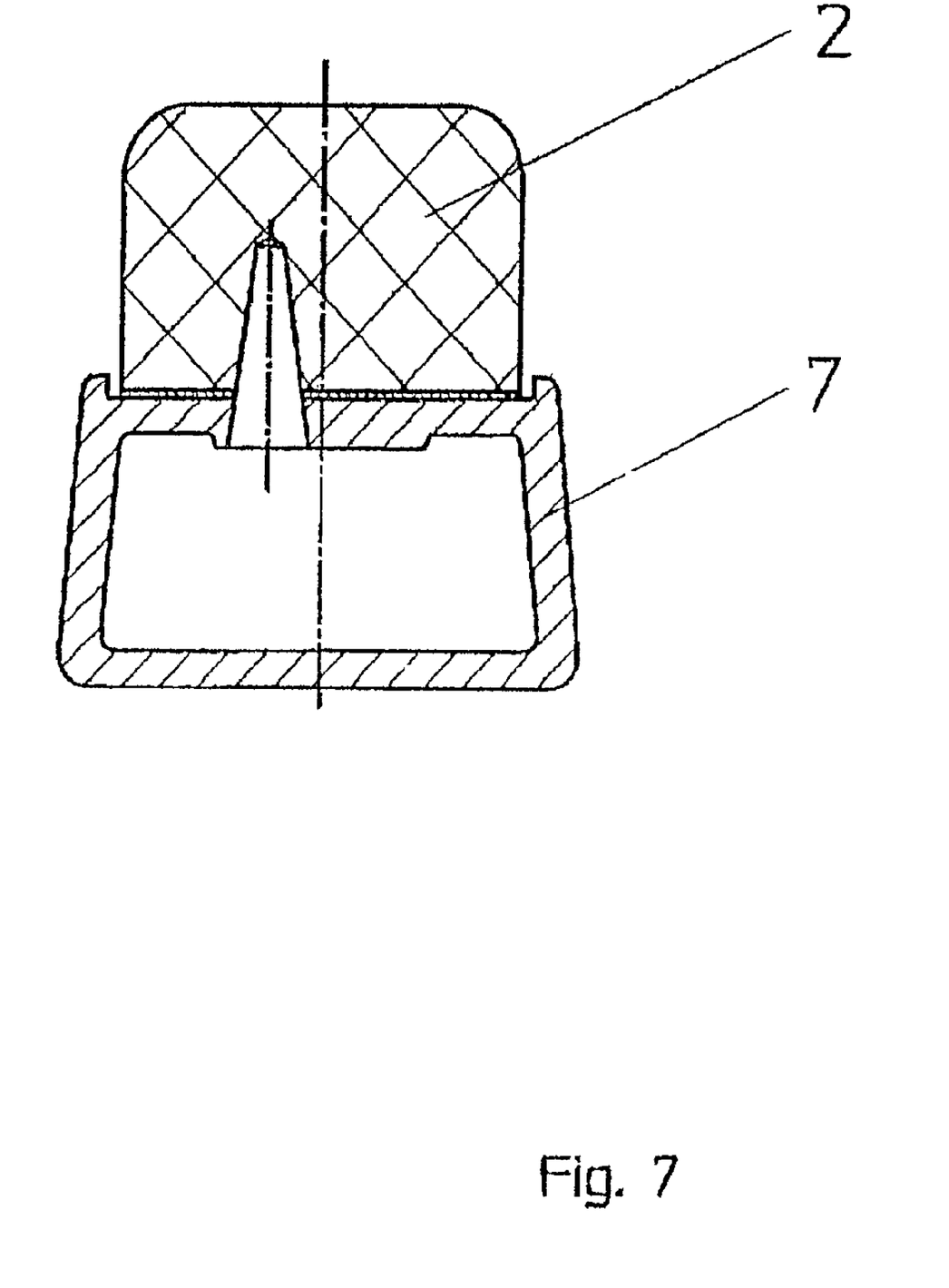
FIG. 7 shows a cross-sectional view of a conical blind hole.

FIG. 7 shows a conical blind hole according to the invention. With a conical shape, progressive wear over time can advantageously be recorded continuously by using media that generate a signal associated with a light measurement, such as a light guide 5, a photodiode 8 or a camera 9.

When using a hydraulic fluid, the fluid discharge rate increases with increasing wear of the contact body, which after suitably processing can be used to indicate the actual condition of the useful thickness of the contact body.

Figure 8:
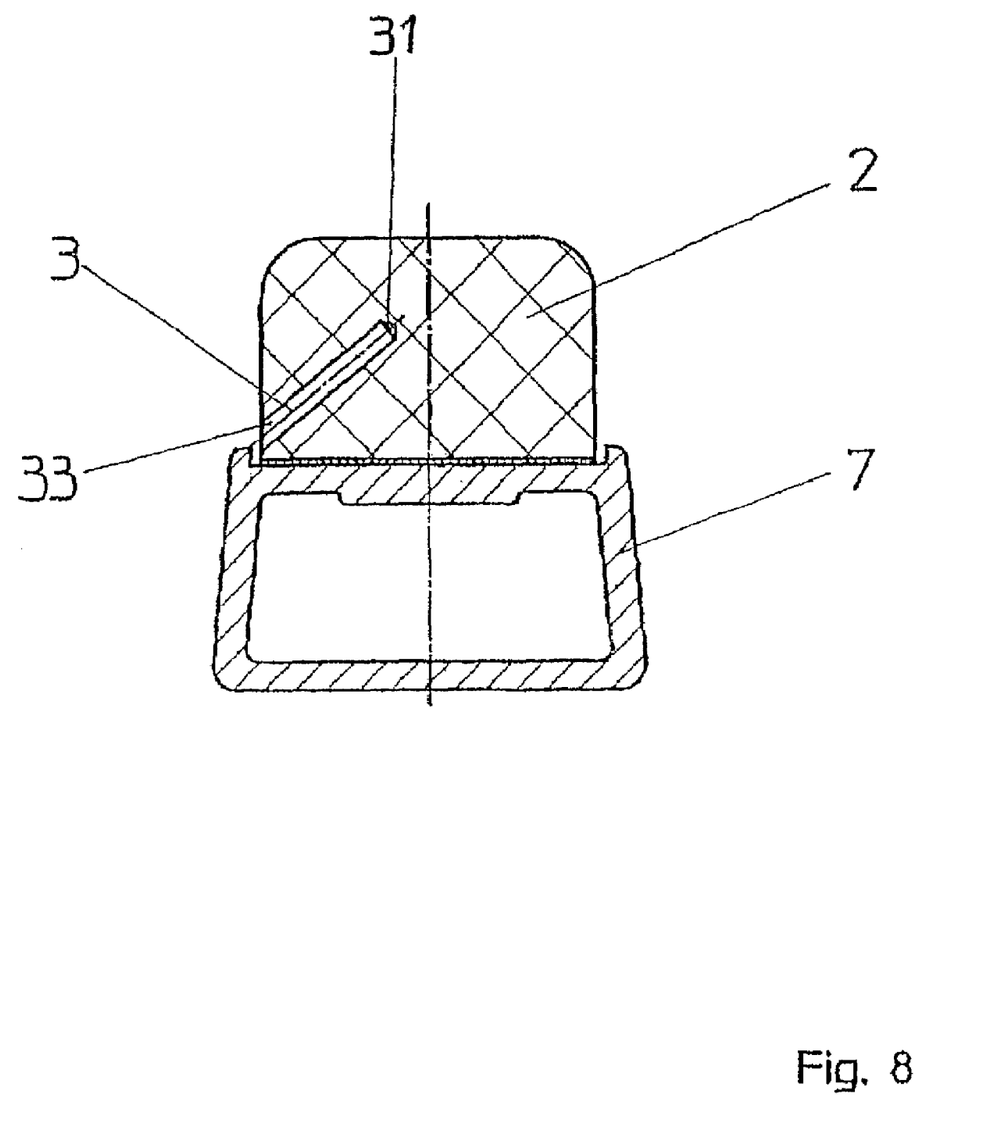
FIG. 8 shows schematically a blind hole introduced from the side at an angle.

FIG. 8 illustrates schematically a blind hole 3 which is introduced into the contact body 2, which is attached to the support 7, at an angle. With the embodiment depicted in FIG. 8, the sensor arrangement of the invention can advantageously be applied to already fabricated contact bars at the later time, without requiring removal of the contact body 2 from the support 7 or machining of the entire contact bar.

Figure 9:
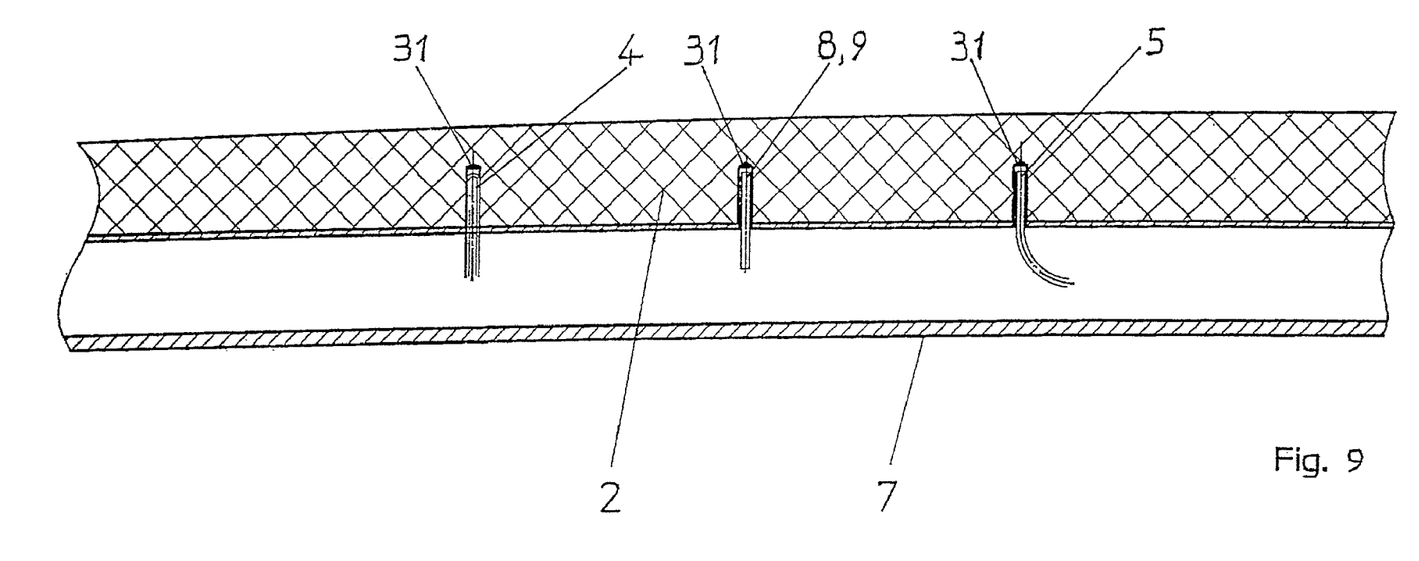
FIG. 9 shows schematically a cross-sectional view of the blind holes with current conductor, photodiode and light guides.

FIG. 9 shows an exemplary arrangement of the current conductor 4, the light guide 5 and the photodiode 8 and/or the camera 9. When the material removal from the contact body 2 reaches the hole bottom 31 of the blind hole 3, the corresponding signals produced by the incident light or by the corresponding current flow for the current conductor 4 are transmitted to the monitoring unit.

Figure 10:
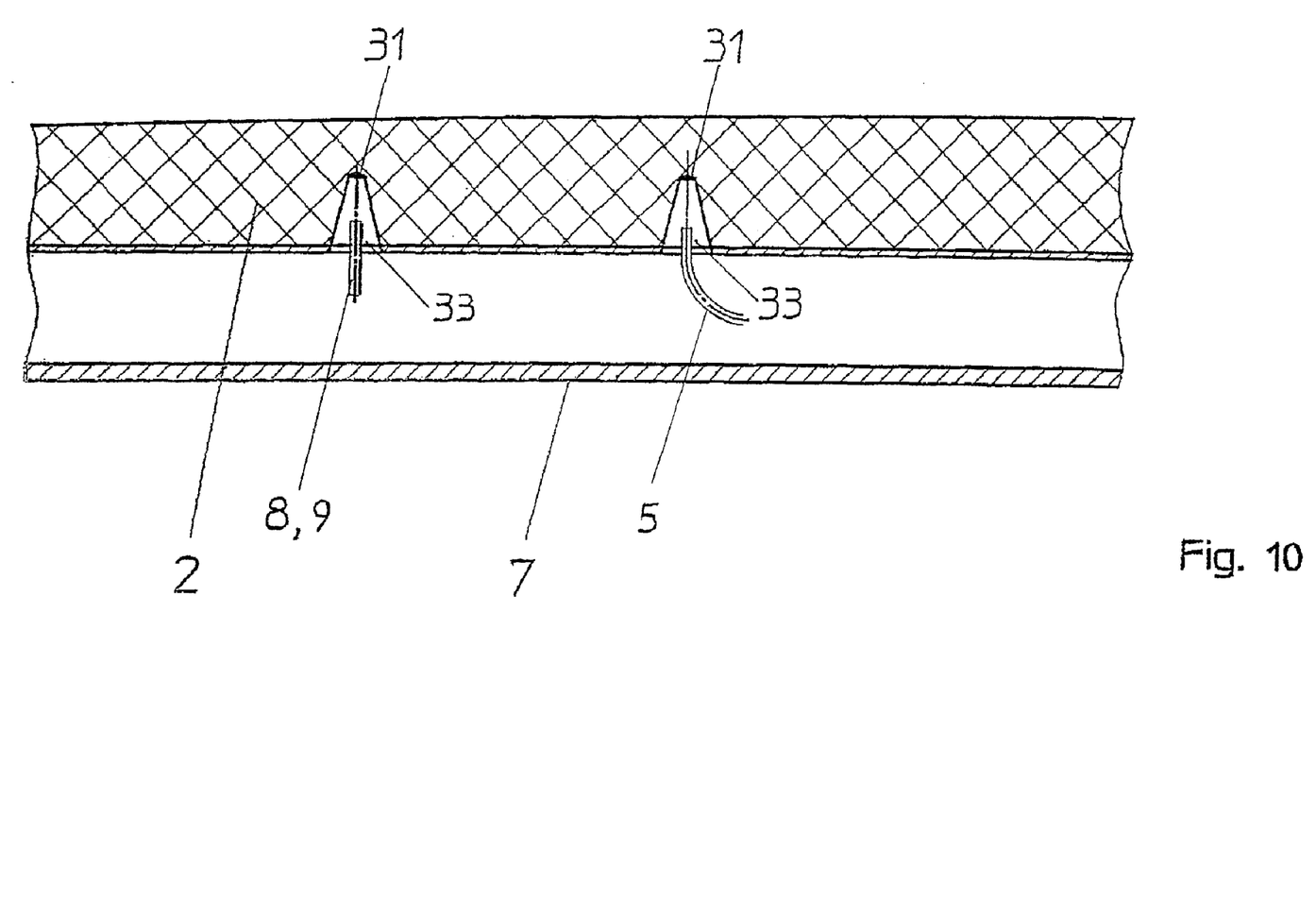
FIG. 10 shows schematically a cross-sectional side view of the conical blind holes and associated photodiode and light guide.

On the other hand, with the arrangement illustrated in FIG. 10, wherein the blind hole 3 has a conical shape and the photodiode 8 and/or the camera 9 and/or the light guide 5 are arranged in a region of the hole entrance opening 33 of the blind hole 3, increased wear increases the size of the opening of the blind hole accompanied by a steady increase in the quantity of incident light. The quantity of light is measured and continuously transmitted, making it possible to determine the wear condition at practically any time.

LIST OF REFERENCE SYMBOLS 1 pantograph
2 contact body
21 contact surface
22 base surface
23 wear height 24 side face
3 blind hole
31 hole bottom
32 hole depth
33 hole entrance opening
34 threaded tube
35 threaded elbow joint
4 current conductor
5 light guide
6 transmission channel
61 threaded insert
62 hose connection
7 support
71 shaped (or contoured) surface
72 support channel
73 sealing pin
8 photodiode
9 camera

The invention claimed is:

1. A sensor assembly for signaling wear conditions on contact bodies of pantographs of electrically driven vehicles, wherein the contact bodies are attached to metallic supports, characterized in that
the sensor assembly comprises blind holes (3) introduced into the contact body (2), transmission channels (6) in communication with the blind holes (3), and a monitoring unit, wherein the blind holes (3) and the monitoring unit are connected via the transmission channels (6), and that a medium which generates signals at a predetermined wear condition is disposed in the blind holes (3), and a medium which transmits these signals to the monitoring unit is disposed in the transmission channel.

2. The sensor assembly according to claim 1, characterized in that
the medium generating the signal and the medium transmitting the signal are identical.

3. The sensor assembly according to claim 1, characterized in that
the medium generating and transmitting the signal is a hydraulic fluid.

4. The sensor assembly according to claim 1, characterized in that
the medium generating and transmitting the signal is an electrically conductive medium.

5. The sensor assembly according to claim 1, characterized in that
the medium generating and transmitting the signal is a light-guiding medium.

6. The sensor assembly according to claim 1, characterized in that
the medium generating the signal and the medium transmitting the signal are not identical.

7. The sensor assembly according to claim 1, characterized in that
the medium generating the signal is a current conductor (4), a light guide (5), a photodiode (8) or a camera (9).

8. The sensor assembly according to claim 1, characterized in that
several blind holes (3) are arranged in spaced-apart relationship.

9. The sensor assembly according to claim 1, characterized in that
the blind holes (3) are arranged vertically.

10. The sensor assembly according to claim 1, characterized in that
the blind holes (3) have different hole depths (5).

11. The sensor assembly according to claim 1, characterized in that
each blind hole (3) or groups of blind holes (3) have separate transmission channels.

12. The sensor assembly according to claim 1, characterized in that
the blind holes (3) extend through a side face (24) of the contact body (2) with an acute angle in the direction of the contact surface (21).

13. The sensor assembly according to claim 1, characterized in that
the blind holes (3) have a cylindrical shape.

14. The sensor assembly according to claim 1, characterized in that
the blind holes (3) have a conical shape.

15. The sensor assembly according to claim 1, characterized in that
the medium generating the signal is disposed at a hole bottom (31) of the blind hole (3).

16. The sensor assembly according to claim 1, characterized in that
the photodiode (8) or the camera (9) are arranged in the area of a hole entrance opening (33) of the blind hole (3).

17. The sensor assembly according to claim 1, characterized in that
the photodiode (8) or the camera (9) are arranged in a conical blind hole (3).

18. The sensor assembly according to claim 1, characterized in that
in addition, a hydraulic fluid is disposed in the blind holes (1), in which a photodiode (8), a camera (9) over a light guide (5) are arranged, and in the associated transmission channels (6).

19. The sensor assembly according to claim 1, characterized in that
the transmission channels (6), which are in communication with the blind holes (3), are arranged in the support (7) below the contact body (2) and are connected from there to the monitoring unit via additional transmission channels.

20. The sensor assembly according to claim 1, characterized in that
the transmission channels (6), which are in communication with the blind holes (3), are arranged outside the support and are connected from there to the monitoring unit via additional transmission channels.

21. The sensor assembly according to claim 1, characterized in that
the transmission channels (6) are implemented as hoses, tubes, support channels, light guides or current conductors.

22. The sensor assembly according to claim 1, characterized in that
a signal acquisition and processing unit is integrated in the monitoring unit.

* * * * *